United States Patent [19]

Crick

[11] Patent Number: 5,339,432

[45] Date of Patent: Aug. 16, 1994

[54] METHOD AND SYSTEM FOR PROVIDING USER CONTROL OF DEVICE DRIVER CONFIGURATION

[75] Inventor: Andrew P. R. Crick, Woodinville, Wash.

[73] Assignee: Microsoft Corporation, Redmond, Wash.

[21] Appl. No.: 960,794

[22] Filed: Oct. 13, 1992

[51] Int. Cl.$^5$ .......................... G06F 3/023; G06F 3/14
[52] U.S. Cl. ............................... 395/700; 364/DIG. 1; 364/245; 364/238.4; 364/280.3
[58] Field of Search ............. 795/700; 364/245, 238.4, 364/280.3, DIG. 1

[56] References Cited

U.S. PATENT DOCUMENTS

| | | | |
|---|---|---|---|
| 4,979,107 | 12/1990 | Advani et al. | 364/200 |
| 4,979,151 | 11/1990 | Advani et al. | 364/200 |
| 5,214,761 | 5/1993 | Barrett et al. | 395/275 |

*Primary Examiner*—Gareth D. Shaw
*Assistant Examiner*—A. Katbab
*Attorney, Agent, or Firm*—Seed & Berry

[57] ABSTRACT

A method and system for providing a user with interactive control of device driver configuration. In a preferred embodiment, during configuration of a device driver composed of multiple component drivers, each of a plurality of available component drivers is invoked for potential inclusion in the device driver. For each available component driver, a component driver definition file is provided which contains definition statements. Also for each available component driver, an entry in a parameter registry is provided which contains a list of configuration parameters to be passed to the available component driver when it is invoked. Upon user selection of a component driver, the corresponding component driver definition file is read and the definition statements from the corresponding component driver definition file are provided to the user. In accordance with user responses to the definition statements, the configuration parameters are assigned appropriate values and updated in the corresponding entry in the parameter registry. As a result, upon a next configuration of the device driver, the modified configuration parameters are passed to the selected component driver when invoked for inclusion in the device driver.

23 Claims, 7 Drawing Sheets

I/O Registry - Before User_PreConfig

| | |
|---|---|
| | ⋮ |
| ED_Driver | / key = oldkey ... |
| | ⋮ |

~702

ED_Driver Definition File

```
        ⋮

OPTION

PROMPT   "Enter New 6 Character
         Encryption Key"

HELP     "The 6 Character Key
         is Used to Convert
         Convert Between
         Normal and Cipher
         Text."

INPUT    6 "/key=@"
CHANGE   "/key"

⋮
```

~701

I/O Registry - After User_PreConfig

| | |
|---|---|
| | ⋮ |
| ED_Driver | / key = newkey |
| | ⋮ |

METHOD AND SYSTEM FOR PROVIDING USER CONTROL OF DEVICE DRIVER CONFIGURATION

TECHNICAL FIELD

The present invention relates generally to the field of device drivers and, more particularly, to a method and system for providing a user with control of device driver configuration.

BACKGROUND OF THE INVENTION

A typical computer system includes various peripheral devices utilized in running a variety of application programs. Such peripheral devices may include any number of disk drives, tape drives, printers, modems, and the like. The typical computer system has an operating system which provides, among many other features, an input/output interface between the application programs and peripheral devices. The typical input/output interface provides a device driver which allows the application programs to utilize one or more of the peripheral devices by controlling input and output between the application programs and peripheral devices.

Conventionally, a device driver or a portion thereof is initially developed by the manufacturer of the peripheral device and incorporated into the operating system to control access to the peripheral device. During startup or restart of the computer system, the operating system automatically configures the incorporated device driver, setting configuration parameters needed by the peripheral device to function correctly or optimally. As one example, the operating system provides an encryption key as a configuration parameter for a device driver that performs data encryption and decryption. The values to which such configuration parameters are set are initially provided by the peripheral device manufacturer when providing its developed device driver to be incorporated into the operating system. Thereafter, these values may be modified by a user of the computer system via input of new values to the operating system. As a result, the user controls configuration of the device driver.

In prior computer systems, user control of device driver configuration has been an awkward process. In order to modify a value of a configuration parameter, the user must specify the configuration parameter to the operating system in a specific format. This rigid format corresponds, for example, to a format required by the device driver during its configuration. Thus, the configuration parameters are not set to the values desired unless they are specified by the user in an exact syntax conforming to this rigid format. Further, such parameters are often required to be specified in a format with which the user has little familiarity. As a result, it is difficult for the user to specify the configuration parameters intuitively. Although guidance regarding this required format may be initially provided to the user by, for example, the device driver manufacturer, such guidance is typically provided in the form of a brief, printed documentation provided along with the device driver. Often, this printed documentation is not retained by the user, and thus becomes unavailable as a reference to help the user control configuration of the device driver.

SUMMARY OF THE INVENTION

An object of the present invention is to provide a method and system for interactively obtaining device driver configuration information from a user.

An object of the present invention is to provide a method and system for providing definition statements to correctly obtain device driver configuration information from the user.

An object of the present invention is to provide a method and system for assigning values to device driver configuration parameters in accordance with configuration information obtained from a user.

An object of the present invention is to provide a method and system for configuring a device driver in accordance with configuration parameters assigned values based on configuration information obtained from a user.

An object of the present invention is to provide a method and system for modifying, adding, resetting and undoing configuration parameters based on configuration information obtained from a user without requiring exact specification of the configuration parameters by the user.

These and other objects of the invention are obtained by a method and system for providing a user with interactive control of device driver configuration, described as follows. Prior to configuration of a device driver, this method and system interactively obtains configuration information from a user based on user responses to definition statements read from a definition file. Based on the obtained configuration information, the inventive method and system assigns appropriate values to the configuration parameters. The configuration parameters are stored in a parameter registry that is accessed during configuration of the device driver. As a result, the device driver is configured in accordance with the configuration information interactively provided by the user.

In a preferred embodiment, the device driver is composed of multiple component drivers. During configuration of the device driver, the preferred method and system invokes each of a plurality of available component drivers for potential inclusion as one of the multiple component drivers in the device driver. For each available component driver, a component driver definition file is provided which contains definition statements to be provided to the user. Also for each available component driver, an entry in the parameter registry is provided which contains a list of configuration parameters to be passed to the available component driver when it is invoked. Upon user selection of a component driver the user wishes to modify, the preferred method and system reads the corresponding component driver definition file and provides to the user the definition statements contained therein. In accordance with user responses to these definition statements, the preferred method and system assigns appropriate values to the configuration parameters, and updates the corresponding entry in the parameter registry by storing the newly assigned values therein. As a result, upon a next configuration of the device driver, the modified configuration parameters are passed to the selected component driver when it is invoked.

DETAILED DESCRIPTION OF THE INVENTION

Figure 1:
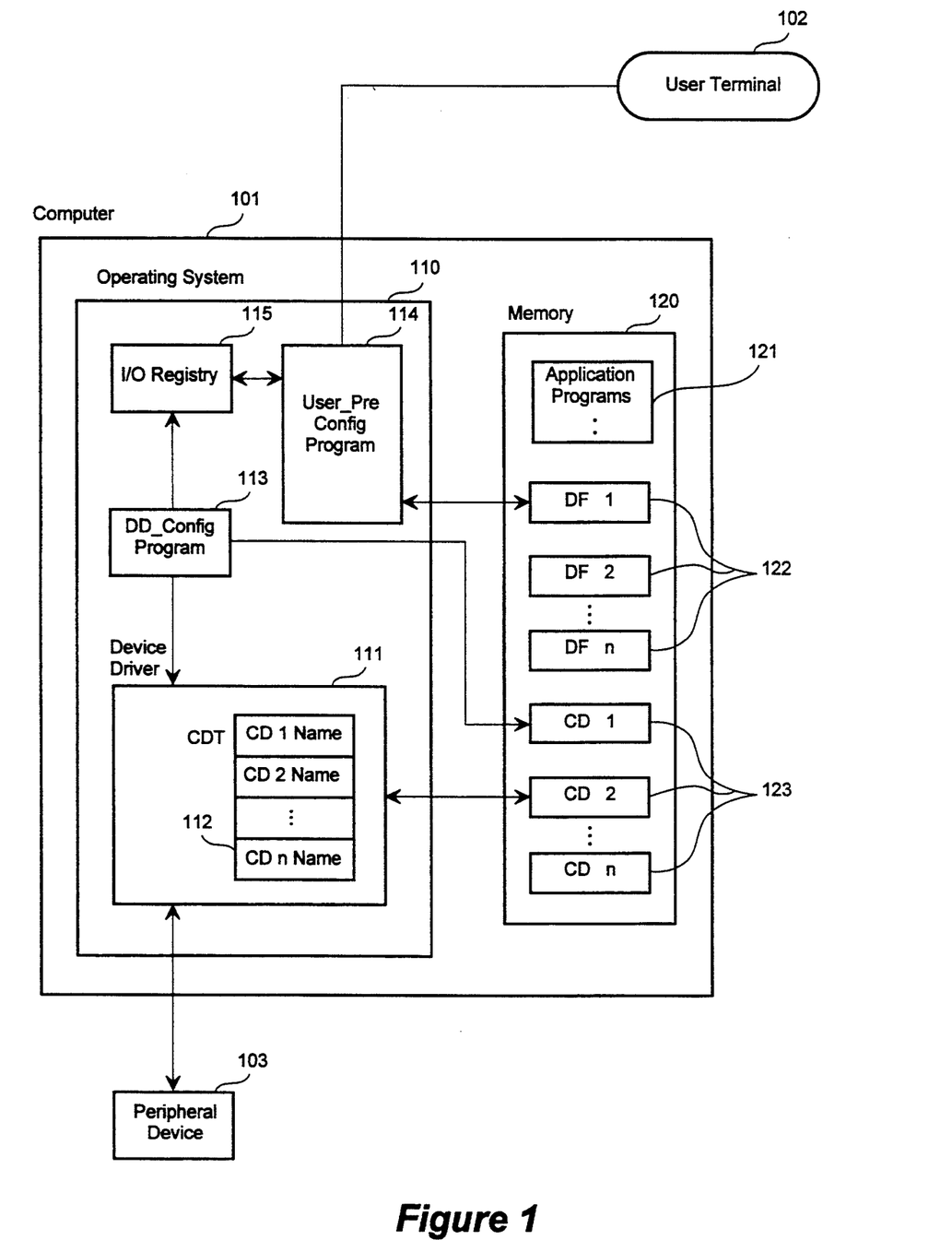
FIG. 1 is a block diagram of a computer system which implements the preferred method and system.

FIG. 1 is a block diagram of a computer system which implements the preferred method and system. In FIG. 1, a computer 101 is connected to a user terminal 102 and a peripheral device 103. Although the computer system could have many such peripheral devices, only one such peripheral device is shown and discussed for simplicity of explanation. The computer has an operating system 110 which includes a device driver 111 having a Call Down Table (CDT) 112, a device driver configuration program (DD_Config Program) 113, a user preconfiguration program (User_Preconfig) 114 and an input/output (I/O) Registry 115 provided as a parameter registry. The computer also has a memory 120 storing application programs 121, definition files 122 and available component drivers 123, each of the component drivers 123 having a corresponding component driver name stored therein.

The device driver 111 is effectively composed of multiple component drivers. It should be understood that these multiple component drivers have been included from among the available component drivers 123 as appropriate during configuration of the device driver. A process by which a device driver is configured to include appropriate component drivers is fully described in U.S. patent application Ser. No. 07/954,920, entitled "Method and System for Configuring and Executing Device Drivers," which is hereby incorporated by reference.

The multiple component drivers consequently included in the device driver are referenced in the CDT 112. The CDT 112 has for each included component driver a CDT entry storing the name of the referenced component driver (CD1, CD2, . . . CDn). As is explained in the above-incorporated application, the CDT entry is added to the CDT 112 when a corresponding component driver is included during configuration of the device driver. Thereafter, when the device driver is invoked by the operating system to control access to a device, the operating system retrieves the CDT entry and executes the included component driver by executing an available component driver 123 that contains the component driver name stored in the CDT 112.

The device driver configuration program 113 configures the device driver to include the multiple component drivers. This program is performed by the operating system upon startup or restart of the computer. One example of such a program is as described in the above-incorporated application. The device driver configuration program 113 invokes each of the available component drivers 123 for potential inclusion in the device driver. When a component driver is so invoked, the device driver configuration program passes configuration parameters to the component driver. The component driver is predesigned by, for example, the device manufacturer, to accept the configuration parameters and configure accordingly. Configuration parameters for device drivers are generally well known in the art. Thus, predesignation of the component driver in the present invention, such that the configuration parameters will be accepted, will be readily apparent to one skilled in the art.

As will be explained presently in detail, the user preconfiguration program (User_PreConfig Program) provides the user with the capability of modifying the configuration parameters that will be passed to the device driver. The user preconfiguration program 114 reads a definition file 122. This definition file corresponds to a requested component driver from among the available component drivers 123 and is read by the user preconfiguration program to provide the user with predefined definition statements from the definition file. In accordance with user responses to these definition statements via input to the user terminal 102, the user preconfiguration program assigns appropriate values to the configuration parameters. The user preconfiguration program stores the configuration parameters having these newly assigned values in an entry in the I/O Registry 115 corresponding to the requested component driver thereby, replacing existing values of the configuration parameters. The I/O Registry 115 is accessed by the device driver configuration program 113 to obtain the configuration parameters passed to each invoked component driver. Thus, when the requested component driver is later invoked during device driver configuration, the configuration parameters passed will have the newly assigned values. As a result, the user does not have to enter the configuration parameters in the rigid format required by the component drivers during configuration.

Figure 2:
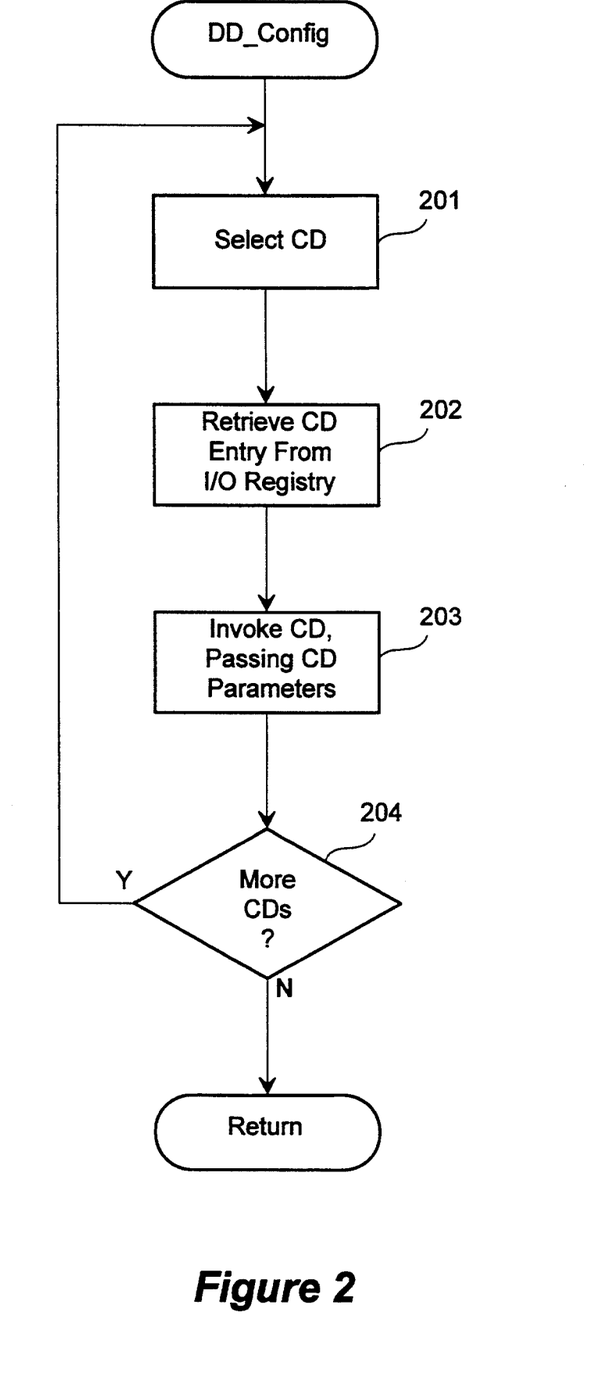
FIG. 2 is a flow diagram of the routine performed by the device driver configuration program upon startup or restart of the computer system.

FIG. 2 is a flow diagram of the routine performed by the device driver configuration program (DD_Config) upon startup or restart of the computer system. In step 201, the routine selects a component driver (CD) from the available component drivers 123. In step 202, the routine retrieves from the I/O Registry a component driver entry includes configuration parameters corresponding to the selected component driver. In step 203, the routine invokes the selected component driver, passing to the invoked component driver the configuration parameters from the retrieved I/O Registry entry. The configuration process carried out by the component driver is described in detail in the above-incorporated application. In step 204, the routine determines whether more available component drivers 123 exist which have not yet been selected. If so, the routine repeats steps 201 through 204. If not, the routine returns control to the operating system, having completed configuration of the device driver. A detailed description of one possible implementation of this routine is described in the above-incorporated application. It should be recognized, however, that one of ordinary skill in the art could easily implement this or a like routine to provide various methods of device driver configuration.

Figure 3:
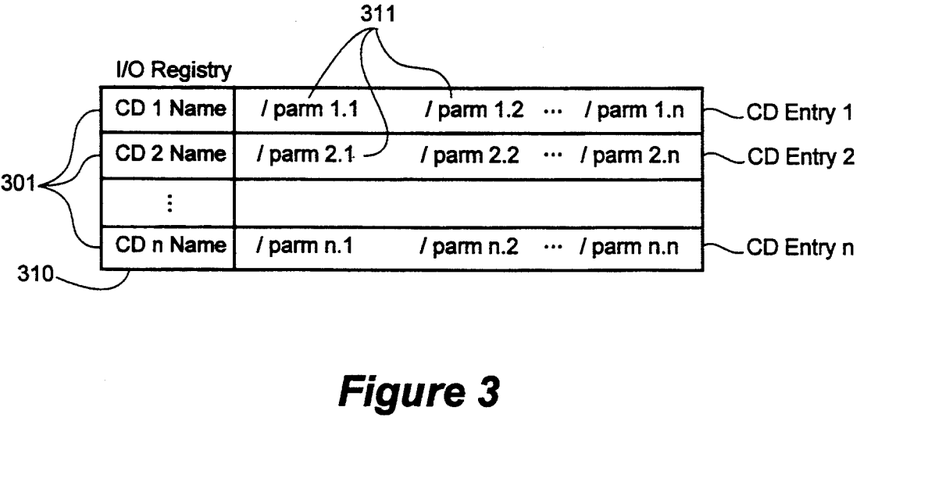
FIG. 3 is an illustration of the data structure of the I/O Registry.

FIG. 3 is an illustration of the data structure of the I/O Registry. The I/O Registry contains component driver entries 301 (CD Entry 1, CD Entry 2, . . . CD Entry n.) Each component driver entry contains a component driver name 310 (CD 1 Name, CD 2 Name . . . CD n Name) and a list of component driver parameters 311 (/parm 1.1 . . . /parm 1.n, /parm 2.1 . . . /parm 2.n, /parm n.1 . . . /parm n.n). Each component driver parameter is stored as an ASCII string, herein called a configuration parameter string. The component driver names 310 correspond to the component driver names of the available component drivers 123 stored in the memory 120. When a component driver is invoked by the device driver configuration program, the device driver configuration program retrieves from the I/O Registry the contents of the component driver entry having the same component driver name as the invoked component driver. The device driver configuration routine then passes the configuration parameters listed in the retrieved entry to the invoked component driver. A component driver may be invoked multiple times, passing to the component driver different configuration parameters each time, by providing multiple component driver entries in the I/O registry, each containing different configuration parameters.

In order for the configuration parameters to be correctly stored in the I/O Registry and passed to the various component drivers, the configuration parameter string representing each configuration parameter must conform to a set of specific format rules. One example of such a set of format rules is described as follows:

1. The configuration parameter string must consist only of ASCII letters (both upper and lower case), numbers, the equal sign ("="), the "at" sign ("@"), the "less than" symbol ("<"), the "greater than" symbol (">") and the slash ("/").
2. Configuration parameter strings must begin with a slash ("/").
3. Configuration parameter strings must be separated by one space.
4. Configuration parameter strings must not include embedded spaces.
5. Configuration parameter strings may include either zero or one "at" sign ("@").

The preferred method and system modifies the values of the configuration parameters, while conforming to the format rules described above. However, one of ordinary skill could readily apply the principles of the invention to modify the values of configuration parameters which conform to any such set of format rules. The preferred method and system accomplishes this modification by providing definition statements to the user and converting user responses to those definition statements to an assignment of appropriate values to the configuration parameters. As a result, the user is able to effectuate modification of the configuration parameters without having to conform to the format rules in specifying these parameters.

Figure 4:
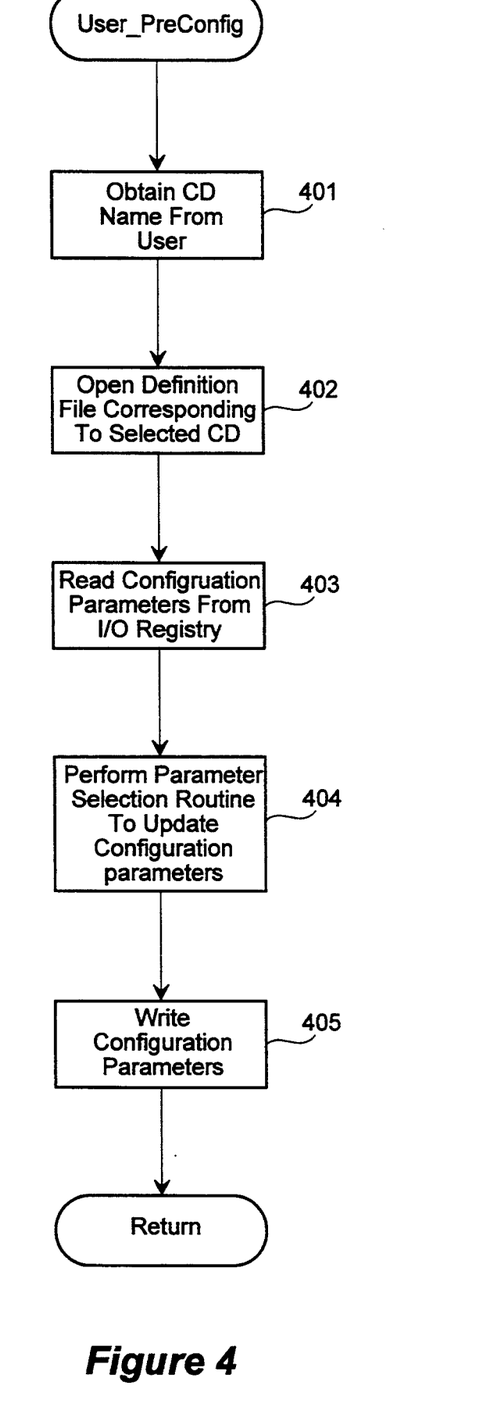
FIG. 4 is a flow diagram of the routine performed by the user preconfiguration program.

FIG. 4 is a flow diagram of the routine performed by the user preconfiguration program (User_Preconfig). This routine is performed by the operating system upon request of the user and allows the user to modify configuration parameters of a selected component driver. In step 401, the routine obtains a selected component driver name from the user which identifies one of the available component drivers 123. The selected component driver name is obtained, for example, via a requested user keyin to the user terminal 102. In step 402, the routine searches the definition files 122 to locate and open a definition file which contains the same component driver name as obtained from the user. In step 403, the routine reads from the I/O Registry configuration parameters corresponding to the selected component driver name. In step 404, the routine performs parameter selection (discussed in detail with reference to FIG. 5) to obtain new values for the configuration parameters for a component driver identified by the selected file name. In step 405, the routine replaces the configuration parameters in the I/O Registry with the new values obtained by the parameter selection routine. The routine then returns to the operating system.

Figure 5:
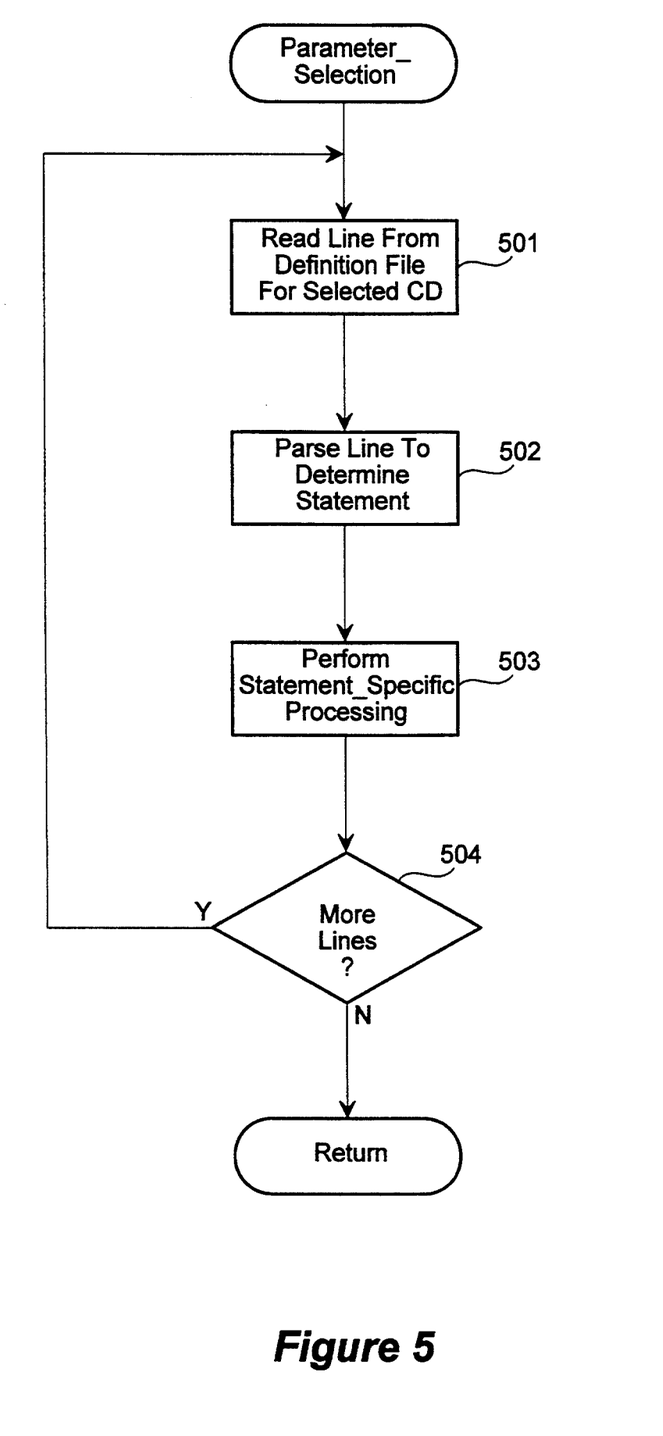
FIG. 5 is a flow diagram of the parameter selection routine performed within the user preconfiguration routine.

FIG. 5 is a flow diagram of the parameter selection routine performed in step 404 of the user preconfiguration routine. The parameter selection routine processes a definition file corresponding to a selected component driver having the selected component driver name to obtain from the user parameters that will be passed to the selected component driver. In step 501, the parameter selection routine reads a line from the opened definition file. It should be remembered that the opened definition file corresponds to the selected component driver whose configuration parameters the user has requested to modify. In step 502, the parameter selection routine parses the line to determine the identity of the definition statement described on the line. In the next paragraphs, the format for the definition statements in a preferred definition file will be described in detail. As a result of this description, one of ordinary skill in the art will readily appreciate how to implement a parsing process sufficient to recognize all such definition statements. In step 503, the routine performs definition statement-specific processing which is specific to the definition statement identified. The definition statement-specific processing will also be described in detail in the following description. One of ordinary skill in the art will readily appreciate how to implement such definition statement-specific processing based on this description. In step 504, the routine determines whether more lines remain to be read from the definition file. If so, steps 501 through 504 are repeated. If not, control returns to the user preconfiguration routine.

Figure 6:
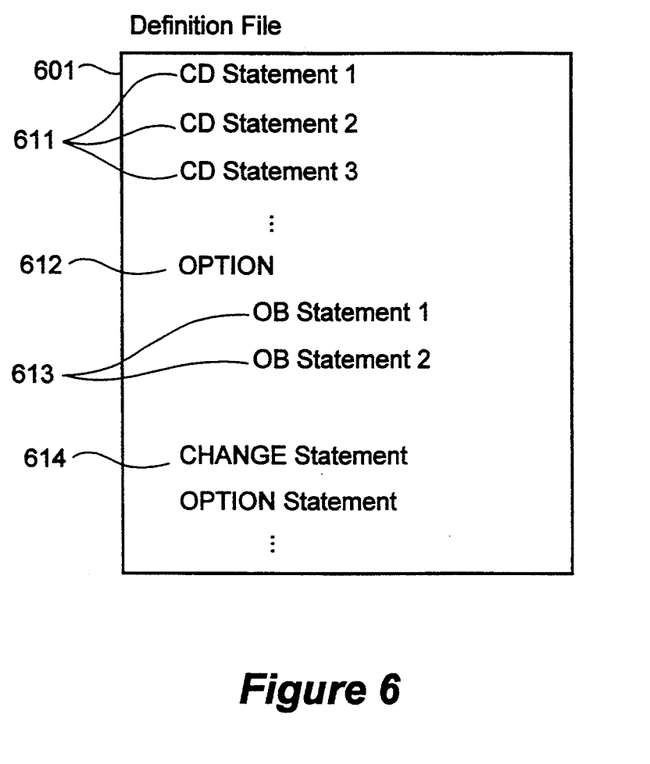
FIG. 6 illustrates an example of the definition statements in a definition file in the preferred system.

FIG. 6 illustrates an example of the predefined definition statements in a definition file of the preferred system. A definition file 601 may contain four types of definition statements: component driver statements, option statements, option block statements and change statements. The component driver statements 611 (CD Statement 1, CD Statement 2, CD Statement 3) are provided at the beginning of the definition file and define various global information defining the component driver. The component driver statements 611 are followed by any number of option statements 612. Each option statement is followed by a set of option block statements 613 and a change statement 614. In a preferred embodiment, the definition statements are defined as described below. Based on the above description, one of ordinary skill in the art could implement the user preconfiguration program to parse these definition statements and perform the corresponding functions described below.

COMPONENT DRIVER STATEMENTS

The preferred method and system provides the following component driver statements:
TITLE
    The TITLE statement causes the user preconfiguration program to display an ASCII string which is provided as a title to generate on screen displays. The format of the TITLE statement is as follows:
        TITLE "<ascii text>"
DATE The DATE statement defines an eight byte ASCII string of the form 'dd/mm/yy'. The user preconfiguration program uses this string as a reference to match component drivers against entries in the I/O Registry in the event that multiple entries are present in the I/O Registry having the same name.

The format of the DATE statement is as follows:
DATE "<ascii dd/mm/yy>"

DEFAULT

The DEFAULT statement is the first of two ways to cause the user preconfiguration program to provide default configuration parameters. The user preconfiguration program provides the configuration parameters from the DEFAULT statement to the I/O Registry as initial values when the user preconfiguration program receives from the user a request to revert to default configuration parameters.

The format of the DEFAULT statement is as follows:
DEFAULT "<configuration parameter(s)>"

DEFAULTn

The DEFAULTn statement is the second of two ways to cause the user preconfiguration program to provide default configuration parameters. The "n" in the DEFAULTn statement represents an integer in the range 1 through 9. The parameter data from the DEFAULTn statement is used as an initial value when the user preconfiguration program receives an nth request to revert to default configuration parameters with respect to a particular component driver.

The format of the DEFAULTn statement is as follows:
DEFAULTn "<configuration parameter(s)>"

DISPLAY

The DISPLAY statement causes the user preconfiguration program to display information on the screen. One or more configuration parameter values may be included in the information displayed. If the information string contains any substrings delimited by "<" and ">", then each substring is replaced by the corresponding configuration parameter.

The format of the DISPLAY statement is as follows:
DISPLAY "<information string>"

DRIVER

The DRIVER statement identifies a file as a definition file so that the user preconfiguration program can determine that the file is to be examined when searching for a definition file of a specified name. A definition file must contain exactly one DRIVER statement.

The format of the DRIVER statement is as follows:
DRIVER

NAME

The NAME statement defines a 16 byte ASCII string which the user preconfiguration program uses to match component drivers against entries in the system's I/O Registry. A definition file must contain exactly one NAME statement.

The format of the NAME statement is as follows:
NAME "<ascii string>"

REVISION

The REVISION statement defines an eight byte ASCII string which the user preconfiguration routine uses to match device drivers against entries in the system's I/O Registry so that multiple versions of configuration parameters may be maintained as revised.

The format of the REVISION statement is as follows:
REVISION "<ascii string>"

TIME

The TIME statement defines an eight byte ASCII string of the form 'hh/mm/ss' which the user preconfiguration program uses to match device drivers against entries in the system's I/O Registry in the event that multiple entries are present in the I/O Registry having the same name.

The format of the TIME statement is as follows:
TIME "<ascii hh/mm/ss>"

THE OPTION STATEMENT

The OPTION statement delimits the start of a group of option block statements which the user preconfiguration program uses to define a configuration parameter in accordance with user responses.

The format of the OPTION statements is, simply:
OPTION

OPTION BLOCK STATEMENTS

The present invention provides the following option block statements:

PROMPT

The PROMPT statement provides an ASCII string which is displayed by the user preconfiguration program when the user is required to key in a value or make a choice.

The format of the PROMPT statement is as follows:
PROMPT "<ascii text>"

HELP

The HELP statement provides an ASCII string which the user preconfiguration program displays when the user requests help.

The format of the HELP statement is as follows:
HELP "<ascii text>"

INVOKE

In a preferred embodiment of the present invention, a program containing additional definition statements can be invoked from within a definition file. The INVOKE statement is used by the user preconfiguration program to execute such a program. An argument, such as a configuration parameter, may be passed to and modified by the invoked program. The return code can be assigned to a configuration parameter string.

The format of the INVOKE statement is as follows:
INVOKE "<programname> <argument>"
<configuration parameter string>

IFPGM

The IFPGM statement causes the user preconfiguration program to conditionally execute a block of statements depending on the result of invoking a program. An argument, such as a configuration parameter, may be passed to the invoked program. The block of statements is delimited by the ENDIF statement. The return code from the invoked program is compared with an immediate value. The block of statements are executed if the comparison is TRUE, but are skipped if the comparison is FALSE.

The format of the IFPGM statement is as follows:
IFPGM "<program name>
<argument>"
<operator> <immediate value>

IF

The IF statement causes the user preconfiguration program to conditionally execute a block of statements. The block of statements is delimited by the ENDIF statement. The value is evaluated according to the operator. The block of statements are executed if the evaluation is TRUE, but are skipped if the evaluation is FALSE. The IF statement may be nested within other IF statements.

The format of the IF statement is as follows:
IF <operator> <value>
ENDIF

AS is described above with respect to the IF and IFPGM statements, the ENDIF statement causes the user preconfiguration program to mark the end of a block of statements, the execution of which is controlled by an IF or an IFPGM statement.

CHOICE

The CHOICE statement causes the user preconfiguration program to build an on screen list of choices from which the user will pick exactly one. The list of choices comprises the ASCII text part of each CHOICE statement. When the user selects a choice, the corresponding configuration parameters are assigned.

The format of the CHOICE statement is as follows:
CHOICE "<ascii text>"
"<configuration parameter string(s)>"

DECIMAL

The DECIMAL statement causes the user preconfiguration program to provide a method for the user to key in an unsigned numeric value which is range checked.

The format of the DECIMAL statement is as follows:
DECIMAL <range>
"<configuration parameter string>"

If the configuration parameter string includes an ("@") sign, when the user is prompted to make a keyin, the value in the current option string which corresponds to the "@" sign is displayed as an initial value which the user can edit or replace. The "@" sign will be replaced by the decimal value keyed in.

HEX

The HEX statement causes the preconfiguration program to provide a method for the user to key in a hexadecimal value which is range checked. The format of the HEX statement is as follows:
HEX <range>
"<configuration parameter string>"

If the option string includes an "@" sign ("@"), when the user is prompted to make a keyin, the value in the current option string which corresponds to the "@" sign is displayed as an initial value which the user can edit or replace. The "@" sign will be replaced by the hexadecimal value keyed in.

INPUT

The INPUT statement causes the user preconfiguration program to provide a method for the user to key in a string which is length checked. The string may contain any character with a value greater than hex 20 (ascii space).

The format of the INPUT statement is as follows:
INPUT <character count> "<option string>"

The character count specifies the maximum length of the string which may be keyed in. If the option string includes an "@" sign ("@"), when the user is prompted to make a keyin, the value in the current option string which corresponds to the "@" sign is displayed as an initial value which the user can edit or replace. The "@" sign will be replaced by the string keyed in.

THE CHANGE STATEMENT

CHANGE

The CHANGE statement causes the user preconfiguration program to allow the user to modify a current configuration parameter. The CHANGE statement must be used to remove previously assigned parameters.

The format of the CHANGE statement is as follows:
CHANGE "<deletion string>"
"<insertion string>"

Figure 7:
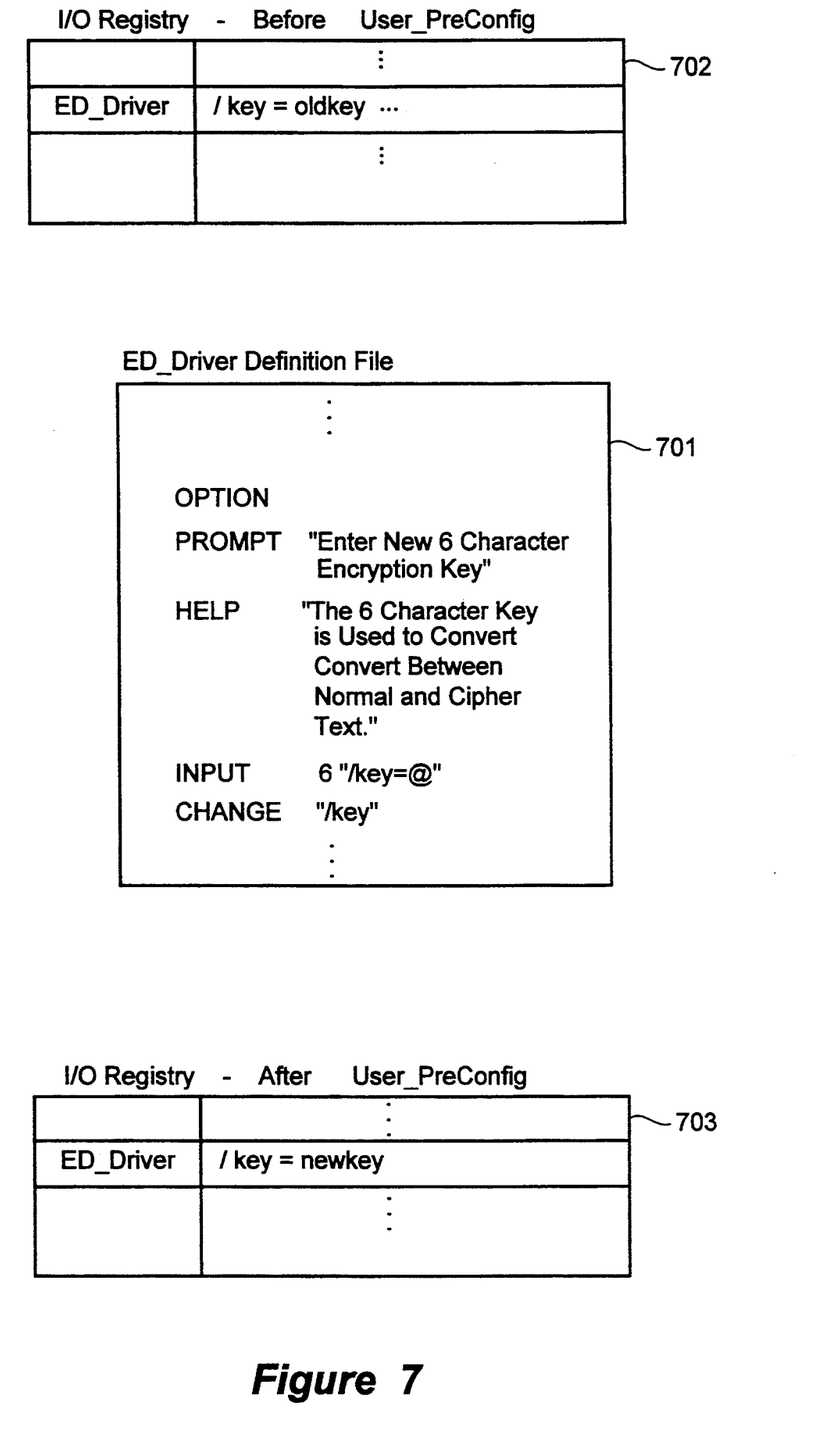
FIG. 7 illustrates an example user modification of a configuration parameter.

FIG. 7 illustrates an example of user modification of a configuration parameter. In the example, an Encryption/Decryption Driver (not shown) is provided as a component driver. A corresponding definition file 701 stores a component driver name "ED_Driver". An entry 702 in the I/O Registry initially stores the component driver name "ED Driver" and a configuration parameter string "/key=oldkey" which represents an encryption key to be used by the component driver to encrypt and decrypt data, operations well known in the art. The encryption key has been initially set to "oldkey" by the manufacturer.

The definition file 701 contains an OPTION statement followed by a set of option block statements (PROMPT, HELP, INPUT) and a CHANGE statement. The user preconfiguration program in the preferred system reads and parses the OPTION statement to determine that option block statements are to follow. The user preconfiguration program reads and parses the PROMPT statement, prints the ASCII text string "Enter New 6 Character Encryption Key" to the user terminal, and prompts the user for input accordingly. The user preconfiguration program next reads and parses the HELP statement and, if the user inputs a help request (via, for example, a HELP function key), prints the help message to the user terminal. The user preconfiguration program reads and parses the INPUT statement and awaits a 6-character ASCII text string from which to assign the configuration parameter "/key." Upon user input of the ASCII string "newkey," the string "newkey" is assigned to the configuration parameter. The user preconfiguration program reads and parses the CHANGE statement, removes the previously assigned value "oldkey" and stores the newly assigned string "newkey." As a result, an updated entry 703 is stored in the I/O Registry which includes the configuration parameter having the newly assigned value.

The inventive method and system has been described with reference to a specific set of definition statements. However, it will be understood that many different types of definition statements having many different formats may be used by the user preconfiguration program to provide a user with control of configuration of the device driver. Also, the user configuration program will readily be implemented by one of ordinary skill not only to modify existing configuration parameters, but also to add new configuration parameters when adding new device drivers or new component drivers therein, to reset configuration parameters to default values, or to undo configuration parameters to previous values as requested by the user. other variations of the inventive method and system will also be readily apparent to one skilled in the art.

What is claimed is:

1. A method, performed by a computer having a device driver, for providing a user with control of configuration of the device driver, the method comprising the steps of:
   identifying definition information for the device driver, the definition information including definition statements that specify a manner in which configuration information is to be obtained from the user and in which a configuration parameter is to be set, each definition statement having a function relating to the setting of configuration information;
   obtaining configuration information form the user in accordance with the definition statements of the identified definition information;
   setting the configuration parameter in accordance with the obtained configuration information and the definition statements of the identified definition information; and
   configuring the device driver in accordance with the set configuration parameter.

2. The method of claim 1 wherein the step of obtaining the configuration information comprises
   reading one of the definition statements; and
   prompting the user in accordance with the read definition statement to obtain the configuration information.

3. The method of claim 2 wherein the step of setting the configuration parameter comprises assigning a value to the configuration parameter based on the obtained configuration information.

4. The method of claim 1 wherein the step of setting the configuration parameter comprises
   reading the configuration parameter from a parameter registry for holding current values of configuration parameters;
   modifying the read configuration parameter in accordance with the obtained configuration information; and
   storing the modified configuration parameter into the parameter registry.

5. A method, performed by a computer having a device driver having component drivers, for providing a user with control of configuration of the device driver, the method comprising the steps of:
   obtaining from the user a selection of one of the component drivers;
   obtaining from the user configuration information for the selected component driver by prompting the user in accordance with definition statements, the definition statements for controlling the setting of a configuration parameter for the selected component driver, each definition statement having a behavior relating to the obtaining of data from the user or the setting of the configuration parameter;
   setting the configuration parameter corresponding to the obtained configuration information in accordance with the definition statements; and
   configuring the selected component driver into the device driver in accordance with the configuration parameter.

6. The method of claim 5 wherein the step of configuring the selected component driver into the device driver comprises
   invoking the selected component driver for inclusion in the device driver; and
   passing the invoked selected component driver the set configuration parameter.

7. The method of claim 5 wherein the step of obtaining the configuration information comprises
   reading component driver definition information containing the definition statements; and
   prompting the user in accordance with the definition statements to obtain the configuration information.

8. The method of claim 7 wherein the step of setting the configuration parameter comprises assigning a value to the configuration parameter in accordance with the definition statements.

9. The method of claim 8 wherein the step of configuring the component driver into the device driver comprises
   invoking the selected component driver for inclusion in the device driver; and
   passing the invoked selected component driver the configuration parameter.

10. The method of claim 5 wherein the step of setting the configuration parameter comprises
    reading the configuration parameter from a parameter registry for holding current values of configuration parameters;
    modifying the configuration parameter in accordance with the obtained configuration information, and
    storing the modified configuration parameter into the parameter registry.

11. The method of claim 10 wherein the step of configuring the component driver into the device driver comprises
    invoking the selected component driver for inclusion in the device driver; and
    passing the invoked selected component driver the configuration parameter.

12. The method of claim 5 further comprising the step of initially obtaining from the user a selection to add a new component driver, and wherein the step of setting the configuration parameter comprises
    designating the configuration parameter for the new component driver in accordance with the obtained configuration information; and
    storing the designated configuration parameter into a parameter registry, the parameter registry for holding current value of configuration parameters.

13. The method of claim 12 wherein the step of configuring the component driver into the device driver comprises
    invoking the selected component driver for inclusion in the device driver; and
    passing the invoked component driver the configuration parameter.

14. The method of claim 5 further comprising the step of initially obtaining from the user a request to reset the selected component driver, and wherein the step of setting the configuration parameter comprises
    resetting the configuration parameter for the selected component driver to a default value; and
    storing the reset configuration parameter into a parameter registry, the parameter registry for holding current values of configuration parameters.

15. The method of claim 14 wherein the step of configuring the selected component driver comprises
    invoking the selected component driver for inclusion in the device driver; and passing the invoked component driver the configuration parameter.

16. A computer system having a device driver, and providing a user with control of configuration of the device driver, the computer system comprising:

means for obtaining device driver configuration information from the user by prompting the user in accordance with definition statements, the definition statements for controlling the setting of a configuration parameter for the device driver, each definition statement having a behavior relating to the obtaining of data from the user or the setting of the configuration parameter;

means for setting a configuration parameter corresponding to the configuration information; and means for configuring the device driver in accordance with the configuration parameter.

17. The computer system of claim 16 further comprising means for storing device driver definition information containing the definition statement for prompting the user to obtain the configuration information.

18. The computer system of claim 16 further comprising means for storing a parameter registry containing a current value of the configuration parameter set by the means for setting the configuration parameter.

19. A computer system having a device driver composed of component drivers, the computer system for providing a user with control of configuration of the device driver and comprising:

means for obtaining a selection of a component driver and configuration information from the suer in accordance with definition statements, the definition statements for controlling the setting of a configuration parameter for the device driver, each definition statement having a behavior relating to the obtaining of data from the user or the setting of the configuration parameter;

means for setting the configuration parameter for the component driver in accordance with the obtained configuration information; and means for configuring a device driver including the component driver in accordance with the configuration parameter by invoking the component driver and passing the configuration parameter to the invoked component driver during configuration of the device driver.

20. The computer system of claim 19, further comprising means for storing a component driver definition information containing a definition statement for prompting the user to obtain the configuration information.

21. The computer system of claim 19 further comprising means for storing a parameter registry containing current values of configuration parameters.

22. A method executed in a computer system for establishing configuration information for configuring a device driver, the method comprising the steps of:

identifying definition information associated with the device driver, the definition information having a plurality of definition statements, the plurality of definition statements for controlling setting of the configuration information for the device driver, each definition statement having an associated behavior, the behaviors including obtaining of data from a user for use in establishing the configuration information and setting the configuration information in accordance to the obtained data; and for each definition statement, performing the behavior associated with the definition statement, whereby data is obtained from a user and configuration information is set in accordance to the obtained data.

23. The method of claim 22 including the steps of creating the definition information by specifying the plurality of definition statements and associating the created definition information with the device driver.

* * * * *

UNITED STATES PATENT AND TRADEMARK OFFICE
CERTIFICATE OF CORRECTION

PATENT NO. : 5,339,432
DATED : August 16, 1994
INVENTOR(S) : Andrew P. R. Crick

It is certified that error appears in the above-indentified patent and that said Letters Patent is hereby corrected as shown below:

In column 11, claim 1, line 17, please delete "form" and substitute therefor --from--.

In column 12, claim 12, line 48, please delete "value" and substitute therefor --values--.

In column 13, claim 19, line 34, please delete "suer" and substitute therefor --user--.

Signed and Sealed this

Fifteenth Day of November, 1994

Attest:

BRUCE LEHMAN

Attesting Officer      Commissioner of Patents and Trademarks